United States Patent Office 3,330,802
Patented July 11, 1967

3,330,802
POLYMERIC COMPOSITIONS STABLE TO LIGHT AND PROCESS FOR THEIR PREPARATION
Luigi Ciceri, Como, Felice Farioli, Fagnano Olona, and Ettore Luzzatto, Milan, Italy, assignors to Snia Viscosa Società Nazionale Industria Applicazioni Viscosa S.p.A., Milan, Italy, a company of Italy
No Drawing. Filed Dec. 9, 1964, Ser. No. 417,211
Claims priority, application Italy, Dec. 13, 1963, Patent 710,328
12 Claims. (Cl. 260—45.75)

It is known that the salts of manganese are in general useful stabilizers to light for polyamides. However they generally impart undesirable colouring. The literature mentions phosphates and hypophosphite to be exempt from this defect.

It has been taught for a long time that one can add, in the polymerization for obtaining polyamides, hypophosphorous acid or its salts, which decompose at the polymerization temperatures (French Patent No. 951,924).

Literature reports on the thermal decomposition of hypophosphorous acid and of its salts, but the products of the decomposition are not precisely identified (see for instance Van Wazer "Phosphorous and Its Compounds" vol. 1, page 363).

The use of hypophosphorous acid and of its compounds as stabilizers against heat for polyamides, is also taught in the literature and it is stated that they should preferably be added to the polymer by impregnation, whereas they can be added also to the molten polymer prior to spinning, but in such case there takes place at least a partial decomposition of said compounds (American Patent No. 2,510,777).

The possibility of adding these compounds to the monomer as stabilizers against heat has not even been taken into consideration heretofore, since it is evident that if they undergo decomposition in the melt-spinning operation, at the polymerization temperatures which are higher and at which the heat is maintained for a longer time, they will decompose completely, according to the concordant indications of the literature and of the cited French Patent No. 951,924. It is stated that manganese hypophosphite is an exception, being considered sufficiently stable to be added to the monomers before polymerization (American Patent No. 2,887,462 and German Patent No. 1,063,378).

Now we have surprisingly found that if one adds manganous phthalate to the monomers as a stabilizer against light and if also hypophosphorous acid or an alkali metal salt of said acid is added, such as sodium hypophosphite in the proportion of at least one mole but preferably at least four moles per one mole of manganese salt, and polymerization is carried out subsequently, one obtains a polyamide stabilized with respect to light with a high degree of whiteness and which does not display the discoloration under oxidizing treatments, which is characteristic of polymers stabilized with manganese salts.

To avoid such discoloration it was suggested to employ as a stabilizer against light certain manganese phosphates, but these compounds do not completely attain the purpose, and furthermore they produce a stabilization against light that is not so permanent as the one obtainable with other manganese salts.

The aforesaid results obtained with the present invention are unobvious since they are apparently due to products of decomposition of the alkali metal hypophosphites or of hypophosphorous acid, the exact nature of which is not known and the behaviour of which certainly could not be predicted; therefore it was totally unexpected that they could lead to such results.

Probably in the polymerization the manganese phthalate penetrates with its phthalic radical into the chain of the polymer to which, thus, also the manganese becomes stably linked. The mechanism of stabilization and of keeping the degree of whiteness and the phenomena that take place during polymerization, are extremely complex and the applicant does by no means wish to depend on any interpretation thereof, because it is to be held that what is suggested in the present specification merely constitutes a theoretically supposable explanation which is not in contrast to ascertained facts.

The quantities of salts employed in carrying out the present invention are comprised within the following limits, expressed as molar proportions. Manganese phthalate is employed in proportions of from 20 to 200 moles per $10^6$ moles of monomer. Hypophosphorous acid or alkali metal hypophosphite are employed in proportions of from 20 to 1000 moles per $10^6$ moles of monomer. The molar ratio between hypophosphorous acid or its alkali metal salt and manganese phthalate is at least 1 to 1 or preferably at least 4 to 1 and not higher than 10 to 1.

Greater excesses of hypophosphorous acid or if its alkali metal salts do not prejudice the stability of the polymer or its colour, on the contrary they tend to improve slightly the degree of whiteness, but have the disadvantage of producing undesirable cross-linking of the polymer itself with consequent difficulty in the spinning operations.

With reference to the molar proportions given above, it should be noted that the manganese phthalate is considered to be employed as a neutral phthalate, namely bisubstituted, with both carboxylic groups salified by manganese. If there should be employed the monosubstituted salts, with a free carboxylic group or with a carboxylic group salified by a cation other than manganese, then, since stabilization against light depends on the presence of a certain quantity of manganese to obtain the same degree of stabilization, as obtained with the use of the neutral salt, it is necessary to increase correspondingly the amount of manganese phthalate used. Vice versa, as to the compound of hypophosphorous acid, it is irrelevant that it be employed as a free acid or as a salt of an alkali metal, except that preferably it is employed as a salt because in this way one reduces the danger of undesirable cross-linking of the polymer, the quantity of said compound employed being equal.

The methods of carrying out the invention do not afford any difficulty. The manganous phthalate and the hypophosphorous acid or a derivative thereof may be added together or separately.

The invention is applicable for obtaining any polyamide and polyester and in general any synthetic linear polymer, but it is preferably applied to obtaining the polymer of caprolactam, known in the trade as Nylon 6, and ethylene polyterephthalate. Since the polymerization takes place in a medium of lactam or in the presence of ethylenic glycol in excess or of monomeric salts, as the case may be, it should be borne in mind that in such conditions the manganous phthalate and the alkali metal hypophosphites are not soluble even when a small percentage of water is present such as is frequently employed as promoter in the polymerization of caprolactam and, therefore, said salts should be conveniently dispersed.

The polymerization of caprolactam is carried out, as is known, by heating to a temperature of from 240 to 300° C. for the duration of from 8 to 30 hours and at any rate until the desired viscosity is obtained, which usually corresponds to a relative viscosity in sulfuric acid of 1% concentration, of between 2 and 3.5, according to what is the desired application of the polymer to be obtained. In the polymerization of caprolactam one normally adds a chain-stabilizer, which may be acetic acid in the proportions corresponding to the desired final degree of polymerization and often also an opacifying agent is added, in particular titanium dioxide. Since the addition of titanium dioxide tends to considerably increase the instability of the polymer against light, this invention finds particular application in the production of opacified polymers and will therefore be described with reference thereto, though it is not necessarily restricted thereto.

For the evaluation of stability against light, one employs the apparatus known as Fade-Ometer wherein samples of yarn obtained from the polymer are subjected to the action of radiations of an arc lamp and the diminution of tenacity is measured after such exposure as a function of the duration of the test. The technique of this measurement is set forth for instance in the U.S.A. Patent No. 3,117,948.

As for the degree of whiteness, instead, it can be evaluated in various ways, but a sufficiently indicative evaluation is obtained by direct visual comparison with a sample having a standard degree of whiteness.

For the purposes of the present invention, test specimens of fabrics made of yarns which were obtained from the polymers prepared according to the present invention, were compared as to stability with fabrics having corresponding count and armature, and obtained from polymers prepared in the same manner and with the same starting materials, but with the exclusion of the manganese compound and of hypophosphorous acid or of its salts when the test regards the stability to light, and with the exclusion only of hypophosphorous acid or of its salts when the test regards the degree of white.

In a previous patent of the same applicant (U.S.A. Patent No. 3,117,948) the use of manganese salts of dicarboxylic acids was claimed, but, to obtain a polymer that does not show obnoxious colouring, restriction was made to the use of their monosubstituted manganous salts, that is to say, with one carboxylic still free.

In another patent of the same applicant (U.S.A. Patent No. 3,148,170) there was described the use of dibasic salt of dicarboxylic acids but under the condition of employing as a chain stabilizer not the acetic acid but acetyl aminocaproic acid or the dicarboxylic acid corresponding to said dibasic salts. However, it is desirable to employ as a stablizer acetic acid and accurate investigations have proved that the use of monobasic salts of dicarboxylic acids—though they provide a white polymer—do not permit obtaining absolute stability upon treatment with oxidizing bleaching agents, which are very common in the art.

By operating according to the present invention one obtains a stability of colour to all treatments higher than is obtainable with the stabilizers previously known of equal effectiveness for the stabilization against light.

The stability against light of the polyesters is much higher than that of the polyamides and, therefore, the problem of stability is not so important; however this invention is useful also for polyesters and in general for any synthetic linear polymer since the polymerization temperature is irrelevant because the decomposition of hypophosphorous acid normally takes place in any case.

The present invention will be more fully understood from the following examples.

*Example 1*

To 12 kg. of caprolactam, molten and kept in an inert atmosphere at 90° C., there are added 54 g. of Anatase type titanium dioxide, 18 g. of glacial acetic acid, 120 g. of epsilon-amino-capronic acid, 1.91 g. of neutral manganese orthophthalate and 0.92 g. of sodium hypophosphite ($NaH_2PO_2 \cdot H_2O$) in finely powdered form. Expressed in terms of molar qauntities and ratios, there are added to one million moles of caprolactam about 81 moles of manganese ortho-phthalate and about 81.8 moles of sodium hypophosphite.

The mass is stirred by means of a special turbo-disperser to ensure perfect dispersion in the molten lactam of the insoluble salts and is then transferred into a 20-litre-autoclave.

The autoclave is brought in the course of two hours to a temperature of 260° C., and is kept at such temperature and at atmospheric pressure for 14 hours while stirring.

At this time, by means of progressive application of vacuum, the autoclave is brought to the residual pressure of 250 mm. Hg.

Finally the polymer formed is extruded by applying pressure with an inert gas, is then cooled and cut into regular chips.

The polymer obtained appears to be perfectly white and has a relative viscosity of 2.75 in sulfuric acid solution (1% concentration).

After washing and drying, the polymer is spun on a melting grid head, in the counts of 15 den. single filament and 30 den. six filaments. The improved stability to light of the yarns obtained by this polymer is easily ascertained.

In fact after 100 hours of exposure to the Fade-Ometer (under the conditions established in the specifications ASTM D 506–50 T) one ascertains an average decrease of tenacity of 2.2% for the count 15/1 and of 3.6% for the count 30/6, while a yarn from the polymer obtained under the same conditions described but without the addition of manganese phthalate and of sodium hypophosphite shows after 100 hours exposure an average tenacity decrease of 43% for the count 15/1 and of 57% for the count 30/6.

The evaluation of the degree of whiteness was carried out by comparison between a fabric obtained with the yarn described above, and a yarn obtained under the same conditions, but without the addition of sodium hypophosphite.

The two white test-specimens of fabric were treated in a bath containing 3 g./liter of sodium chloride, at 70° C. for 1 hour. After such treatment it is observed that while the yarn containing manganese phthalate and sodium hypophosphite keeps the original grade of whiteness, the control fabric not containing sodium hypophosphite undergoes appreciable yellowing.

*Example 2*

Operation is as in Example 1, employing as a stabilizer 1.43 g. of neutral manganese ortho-phthalate and 2.77 g. of sodium hypophosphite ($NaH_2PO_2 \cdot H_2O$). Expressed in terms of molar quantities, about 61.4 moles of manganese orthophthalate and about 246 moles of sodium hypophosphite are added to one million moles of the monomer.

The polymer obtained appears to be perfectly white and has a relative viscosity in sulfuric acid (1% concentration) of 2.85.

The average percent of tenacity diminution of the filaments obtained with this polymer after 100 hours of exposure to the Fade-Ometer under the conditions described in Example 1, appears to be equal to 3% for the count 15/1 and to 4.3% for the count 30/6, against a diminution (average percent) of 43% for the count 15/1 and 75% for the count 30/6 found on the yarn of a polymer obtained under equal conditions, but without the addition of manganese phthalate and of sodium hypophosphite. A fabric obtained with yarn of this test, keeps perfectly its grade of whiteness after oxidizing bleaching treatment with chloride, as described in Example 1, while a comparable fabric obtained without sodium hypophosphite displays appreciable yellowing.

*Example 3*

Operation is carried out as in Example 2 but employing as an opacifying agent 240 g. (2% by weight on the monomer) of Anatase-type titanium dioxide. The polymer obtained appears to be perfectly white and has a relative viscosity in sulfuric acid solution of 2.87. Two different counts were prepared: 15/1 and 40/10.

The average percent reduction of tenacity in the yarns obtained with this polymer after 100 hours of exposure to the Fade-Ometer under the conditions described in Example 1, appears to be 5.2% for the count 15/1 and 9.7% for the count 40/10, against an average diminution of 42% for the count of 15/1 and of 70% for the count 40/10 as found on the yarn of a polymer obtained under equal conditions but without the addition of manganese phthalate and of sodium hypophosphite.

A fabric obtained with the yarn of this test, after an oxidizing bleaching treatment with chlorite, as described in Example 1, maintains perfectly its grade of whiteness, while a comparable fabric obtained without hypophosphite shows appreciable yellowing.

*Example 4*

Operation is as in Example 1, but employing as a stabilizer 1.43 g. of neutrol manganese ortho-phthalate and of 6.92 g. of sodium hypophosphite ($NaH_2PO_2 \cdot H_2O$) and in lieu of the epsilon-aminocaproic acid, 200 ml. of distilled water. In other words, about 61.4 moles of manganese orthophthalate and about 615 moles of sodium hypophosphite are added to one million moles of the monomer.

The polymer obtained appears to be perfectly white and has a relative viscosity in sulfuric acid (1% concentration) of 2.94.

The average percent of tenacity decrease of the yarns obtained with this polymer after 100 hours of exposure to the Fade-Ometer under the conditions described in Example 1, appears to be 3.2 for the count 15/1 and 4.6 for the count 30/6 against an average diminution of 43% for the count 15/1 and of 57% for the count 30/6 found on the yarn of a polymer obtained under equal conditions, but without the addition of manganese phthalate and of sodium hypophosphite.

A fabric made with the yarn of this test, after an oxidizing bleaching treatment with chlorite, as described in Example 1, keeps perfectly its grade of whiteness, while a comparable fabric obtained without sodium hypophosphite, shows appreciable yellowing.

*Example 5*

Operation is carried out as in Example 4 by employing as a stabilizer 1.91 g. of neutral manganese ortho-phthalate and 2.31 g. of hypophosphorous acid ($H_3PO_2$, 50% solution). In other words, about 81 moles of manganese orthophthalate and about 330 moles of hypophosphorous acid are added to one million moles of the monomer.

The polymer obtained appears to be perfectly white and has a relative viscosity in sulfuric acid (1% concentration) of 2.89.

The percent of tenacity drop of the yarns obtained with this polymer after 100 hours of exposure to the Fade-Ometer in the conditions described in Example 1 appears to be 1.8% for the count 15/1 and 2.4% for the count 30/6, against an average percent diminution of 43% for count 15/1 and of 57% from the count 30/6 as found on the yarn of a polymer obtained under equal conditions but without the addition of manganese phthalate and of hypophosphorous acid.

A fabric obtained with the yarn of this test, after an oxidizing bleaching treatment with chlorite, as described in Example 1, keeps perfectly its degree of whiteness, while the control fabric obtained without hypophosphorous acid shows appreciable yellowing.

*Example 6*

Operation is as in Example 4 employing as a stabilizer 1.43 g. of neutral manganese ortho-phthalate and 2.73 g. of potassium hypophosphite ($KH_2PO_2$). In other words, about 61.4 moles of manganese ortho-phthalate and about 247 moles of potassium hypophosphite are added to one million moles of the monomer.

The polymer obtained appears to be perfectly white and has a relative viscosity in sulfuric acid (1% concentration) of 2.84.

The average percent diminution of tenacity of the yarns obtained with this polymer after 100 hours of exposition to the Fade-Ometer under the conditions described in Example 1 appears to be 3.2% for the count 15/1 and 4.8% for the count 30/6, against an average diminution of 43% for the count 15/1 and of 57% for the count of 30/6 as found on the yarn of a polymer obtained under equal conditions but without the addition of manganese phthalate and of potassium hypophosphite.

A fabric obtained with the yarn of this test, after an oxidizing bleaching treatment with chlorite, as described in Example 1, keeps perfectly its grade of whiteness, whilst a comparable fabric obtained without potassium hypophosphite shows appreciable yellowing.

*Example 7*

Into a 30 litres autoclave there are charged 8 kg. of dimethyl terephthalate, 76 kg. of ethylene glycol, 2.4 g. of zinc acetate, 4.8 g. of antimonium trioxide, 32 g. of Ru-type titanium dioxide, 1.28 g. of neutral manganese phthalate and 2.46 g. of sodium hypophosphite ($NaH_2PO_2 \cdot H_2O$), while stirring conveniently to ensure the dispersion of the insoluble salts. In other words, about 142 moles of manganese phthalate and about 546 moles of sodium hypophosphite are added to one million moles of dimethyl terephthalate.

Heating is effected to 140–180° C. at atmospheric pressure, distilling the methyl alcohol of re-esterification.

After about 6 hours, the reaction of esterification is completed, then the temperature is brought to 220° C., in order to distill the excess of glycol at atmospheric pressure.

At this time the temperature is gradually increased up to 280° C. in the course of 2 hours, contemporaneously and progressively applying vacuum in the autoclave until attaining a residual pressure lower than 1 mm. Hg.

It is kept under such conditions (280° C., residual pressure lower than 1 mm. Hg.) for a period of 4 hours.

The polymer so obtained is extruded by means of an inert gas pressure; it is cooled, cut and collected in chips.

There is obtained a polymer of white colour, with intrinsic viscosity in solution of phenol-tetrachloroethane (60–40) of 0.6.

After drying, the polymer is melt-spun in a count of 70 deniers 34 filaments. This yarn, after exposure of 300 hours to the Fade-Ometer (under the conditions described in Example 1) shows an average tenacity drop of 6%, while a yarn of equal count and number of filaments as obtained from a polymer produced under the same conditions described, but without the addition of manganese phthalate and of sodium hypophosphite, shows after 300 hrs. of exposition an average tenacity diminution of 33%.

A fabric obtained with the yarn of this test surprisingly shows a grade of whiteness distinctly superior to that of a control fabric obtained without the sodium hypophosphite and, moreover, after an oxidizing bleaching treatment with chlorite, as described in Example 1, it keeps perfectly its grade of whiteness, as compared to the control fabric which shows an appreciable yellowing.

The embodiments of the invention in which an exclusive property or privilege is claimed are defined as follows:

1. A linear synthetic polymer of the group consisting of polyamides and polyesters, stable to light and possessing a high degree of whiteness and resistance to discoloration under oxidizing treatment, which has incorporated therein manganese phthalate and a product resulting from thermal decomposition, at the polymerization temperature of said polymer, of a compound selected from the group consisting of hypophosphorous acid and its alkali metal salts, from 20 to 200 moles of insoluble manganese phthalate and from 20 to 1000 moles of said compound being uniformly dispersed in one million moles of the monomeric substance prior to polymerization of said substance, the molar ratio between said phthalate and said compound being between 1 to 1 and 1 to 10.

2. The polymer defined in claim 1, obtained by adding to the monomeric substance manganese phthalate and said compound in a molar ratio of about 1 to 4.

3. The polymer defined in claim 1, wherein said compound is selected from the group consisting of sodium hypophosphite and potassium hypophosphite.

4. The polymer defined in claim 1, wherein the manganese phthalate is neutral manganese orthophthalate.

5. The polymer defined in claim 1, wherein said monomeric substance is diethylene terephthalate.

6. The polymer defined in claim 1, which is polycapronamide.

7. A process for producing a synthetic linear polymer consisting of a polyamide or of a polyester, stable to light and possessing a high degree of whiteness and capable of resisting discoloration under oxidizing treatment, comprising adding to the monomeric substance, prior to polymerization, a manganese phthalate which is insoluble in the reaction mixture, and a compound selected from the group consisting of hypophosphorous acid and its alkali metal salts, the manganese phthalate being added in the ratio of 20 to 200 moles per million moles of said substance, said compound being in the ratio of from 20 to 1000 moles per million moles of said substance, and the molar ratio between said phthalate and said compound being between 1 to 1 and 1 to 10, thoroughly mixing and dispersing said phthalate and said compound in said substance, heat-polymerizing the mixture of said substance, said pthalate, and said compound, thereby to cause thermal decomposition of said compound, and processing the polymerized product to provide a synthetic linear polymeric filamentary material including in its structure said manganese phthalate and the product of said thermal decomposition.

8. A process as defined in claim 7, wherein the monomer is caprolactam, and from about 60 to about 80 moles of manganese phthalate and from about 80 to about 600 moles of said compound are added per million moles of caprolactam.

9. The process as defined in claim 8 wherein the manganese phthalate is added in an amount from about 60 to about 80 moles, and the compound is added in an amount of from about 240 to about 330 moles per one million moles of caprolactam.

10. The process as defined in claim 7 wherein the monomer is diethylene terephthalate, and about 142 moles of manganese phthalate and about 564 moles of said compound are added per one million moles of diethylene terephthalate.

11. The process defined in claim 7, wherein said manganese phthalate is a neutral manganese orthophthalate.

12. The process defined in claim 7, wherein said compound is selected from the group consisting of sodium hypophosphite and of potassium hypophosphite.

References Cited

UNITED STATES PATENTS

| | | | |
|---|---|---|---|
| 2,887,462 | 5/1959 | Van Oot | 260—45.75 |
| 3,070,575 | 12/1962 | Cramer | 260—45.75 |
| 3,160,597 | 12/1964 | Costain et al. | 260—45.75 |
| 3,242,134 | 3/1966 | Papero | 260—45.75 |
| 3,314,919 | 4/1967 | Most | 260—45.85 |

DONALD E. CZAJA, *Primary Examiner.*

G. W. RAUCHFUSS, V. P. HOKE, *Assistant Examiners.*